UNITED STATES PATENT OFFICE.

ALFRED KERN, OF BASLE, SWITZERLAND, ASSIGNOR TO BADISCHE ANILIN AND SODA FABRIK, OF MANNHEIM, GERMANY.

MANUFACTURE OF SOLUBLE METHYL-BLUE FROM ROSANILINE.

SPECIFICATION forming part of Letters Patent No. 333,861, dated January 5, 1886.

Application filed June 8, 1885. Serial No. 168,049. (No specimens.)

*To all whom it may concern:*

Be it known that I, ALFRED KERN, a citizen of the Swiss Republic, residing at Basle, in the canton of Basle, in Switzerland, have invented new and useful Improvements in the Manufacture of a Blue Dye-Stuff or Coloring-Matter, of which the following is a specification.

This invention relates to a blue dye-stuff or coloring-matter, which I term "methyl-blue S," and which is produced by sulphonating triphenyltrimethylrosaniline, a blue coloring-matter discovered by Alfred Sarauw, and described by him, (in his inaugural dissertation, Zurich, A. D. 1881,) as resulting from the action of oxychloride of carbon (phosgene) upon methyldiphenylamine.

In carrying out my invention I first prepare the hereinbefore-named triphenyltrimethylrosaniline by the following improved process, which is the joint invention of myself and Carl Ludwig Müller, and forms the subject-matter of a separate application for a patent.

According to the said improved process, one hundred parts, by weight, of methyldiphenylamine are heated to about 100° centigrade, and then, under constant agitation, a current of gaseous oxychloride of carbon (phosgene gas) is slowly allowed to enter in sufficient quantity to produce an increase of weight amounting to about twenty-five parts, by weight. I then add about twenty parts, by weight, of dry and finely-powdered chloride of zinc, and after about six hours constant agitation, and while maintaining the temperature of the mixture at about 100° centigrade, I again add a fresh supply of oxychloride of carbon in sufficient quantity to produce an increase of weight of the mixture amounting to about twelve parts, by weight. The reaction is then allowed to proceed at the said temperature during the space of about three or four hours, or until a bronze-like "melt" has been formed. In order to separate the coloring-matter thus produced from any methyldiphenylamine which may have remained unacted upon, and from other products contained in the said melt, any of the various methods may be employed which are in use for a similar purpose.

I have found it convenient first to treat the crude coloring-matter with caustic-soda liquor and steam, so as to volatilize the excess of methyldiphenylamine, (which may thus be recovered by distillation,) and to obtain the base of the coloring-matter. The base thus obtained is then dissolved in about two hundred parts, by weight, of concentrated sulphuric acid of about 64° Baumé at a temperature of about from 70° to 80° centigrade, and while maintaining the said temperature about fourteen hundred parts, by weight, of hydrochloric acid of about 28° Baumé are gradually added, when the coloring-matter will be again precipitated in a conglomerated condition, and may then be easily separated from the cooled-down acid solution by decantation. A further purification of the coloring-matter thus produced is effected by washing the same first with strong hydrochloric acid, and afterward with hot water until the acid mother-liquor has been completely removed. The hydro-chlorate of triphenyltrimethylrosaniline thus prepared is then dried in a steam-pan and ready for use. In order to sulphonate the said coloring-matter, or to convert the same into a sulpho-acid soluble in water, the known methods for converting "aniline-blues" into their corresponding "soluble blues" may be employed.

In practice the following process has been found to produce good results: One part, by weight, of dry and finely-powdered triphenyltrimethylrosaniline is gradually added to about four parts, by weight, of fuming sulphuric acid containing about twenty-four per cent. of sulphuric anhydride, and care is taken to maintain the temperature of the acid throughout the mixing operation between zero and about 5° centigrade. After the mixing has been completed the temperature of the mixture or solution thus obtained is gradually raised to about 60° centigrade, and kept at the said temperature during the space of about from thirty to forty-five minutes, or until a sample of the sulpho-acid thus produced forms a clear solution with pure water. This point being arrived at, the acid solution is carefully diluted with cold water and neutralized with milk of lime. The solution of the lime salt of methyl-blue S thus produced is then separated from the insoluble gypsum by means of a filter-press, and it may afterward be evaporated to dryness; or it may be decomposed by the addition of the carbonates of soda, or of ammonia, if it be desired to prepare the coloring-matter in the form of its corresponding soda or ammonia salts.

Methyl-blue S prepared as above described possesses the general properties of soluble aniline-blues. The free sulpho-acid dissolves in pure water with a bright-blue color. This solution is decolorized by the addition of caustic alkalies, or upon being gently heated with an excess of caustic ammonia. The color is restored by the addition of acids. Concentrated aqueous solutions of the salts of methyl-blue S are precipitated by the addition of hydrochloric acid. The sulpho-acid thus precipitated is, as above said, again soluble in pure water.

Methyl-blue S is distinguished from the soluble sulpho-acids of ordinary aniline-blues by the following characteristic properties: It dissolves in concentrated sulphuric acid with a yellow or orange-yellow color. A large excess of strong hydrochloric acid turns its solutions green. If its saline compounds be mixed with about three or four times their bulk of sal-ammoniac, and then submitted to destructive distillation, the subliming portions will contain (besides sal-ammoniac) a basic oil, which may be extracted therefrom by sulphuric ether, and which, in its isolated state, presents the peculiar smell and other characteristic properties of methyldiphenylamine. The said basic oil, upon being gently heated with chloranil, is quickly converted into the known methyldiphenylamine-blue.

Methyl-blue S is a blue coloring-matter or dye-stuff suitable for dying and printing in a similar manner as soluble aniline-blue.

What I claim as new, and desire to secure by Letters Patent, is—

As a new product, methyl-blue S, the blue dye-stuff or coloring-matter produced by the sulphonization of trimethyltriphenylrosaniline, as hereinbefore described, and having the characteristics above set forth.

In testimony whereof I have hereunto set my hand and seal in the presence of two subscribing witnesses.

ALFRED KERN. [L. S.]

Witnesses:
HEINRICH CARO,
CARL LUDWIG MÜLLER.